United States Patent
Justifus et al.

(10) Patent No.: US 10,460,532 B2
(45) Date of Patent: Oct. 29, 2019

(54) METHOD AND SYSTEM TO IDENTIFY PROXIMITY DISTANCE

(71) Applicants: Asir Justifus, Johns Creek, GA (US); Yasin Mohamed, Tirunelveli (IN); Vino Kingston, Dallas/Fort Worth Area, TX (US); Gowtham Sen Potnuru, Hyderabad (IN)

(72) Inventors: Asir Justifus, Johns Creek, GA (US); Yasin Mohamed, Tirunelveli (IN); Vino Kingston, Dallas/Fort Worth Area, TX (US); Gowtham Sen Potnuru, Hyderabad (IN)

(*) Notice: Subject to any disclaimer, the term of this patent is extended or adjusted under 35 U.S.C. 154(b) by 68 days.

(21) Appl. No.: 15/642,378

(22) Filed: Jul. 6, 2017

(65) Prior Publication Data
US 2019/0012850 A1    Jan. 10, 2019

(51) Int. Cl.
| | |
|---|---|
| *G07C 5/00* | (2006.01) |
| *G07C 5/08* | (2006.01) |
| *G01S 19/42* | (2010.01) |
| *G08G 1/00* | (2006.01) |

(52) U.S. Cl.
CPC .............. *G07C 5/008* (2013.01); *G01S 19/42* (2013.01); *G07C 5/085* (2013.01); *G08G 1/20* (2013.01); *G07C 2209/63* (2013.01)

(58) Field of Classification Search
CPC .......... G07C 5/008; G07C 5/085; G08G 1/20; G01S 19/42
See application file for complete search history.

(56) References Cited

U.S. PATENT DOCUMENTS

2017/0359736 A9* 12/2017 Dieckmann ........... H04W 76/14

* cited by examiner

*Primary Examiner* — Yuen Wong
(74) *Attorney, Agent, or Firm* — KA Filing LLC; Wayne V. Harper

(57) ABSTRACT

The present invention discloses a method to identify distance proximity between driver and a vehicle comprising; capturing geo location of the vehicle; capturing geo location of the driver; comparing the distance proximity between geo location of the vehicle and the geo location of the driver, wherein the proximity distance is calculated at same instance of time; an ascertaining that the driver and vehicle are in a same place in case the distance proximity is within a tolerable distance.

8 Claims, 4 Drawing Sheets

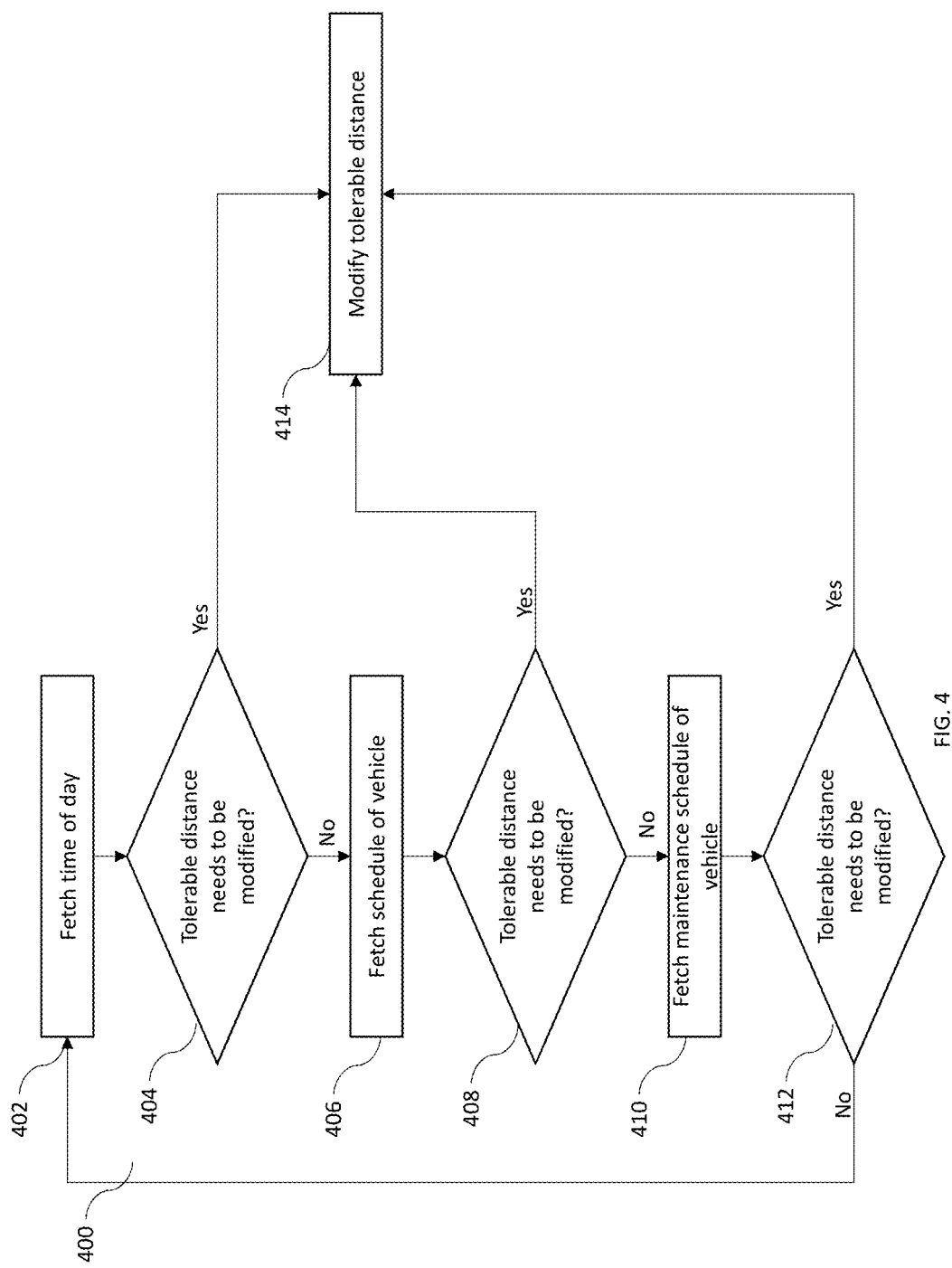

METHOD AND SYSTEM TO IDENTIFY PROXIMITY DISTANCE

TECHNICAL FIELD

The present invention relates to a method and system of identifying proximity distance, more particularly, the present invention relates to a method and system of identifying correlative distance between a vehicle and its driver and distance proximity in between the two.

BACKGROUND OF THE INVENTION

Vehicle tracking is a common practice that is followed these days. Vehicle tracking is done for fleet management, vehicle condition tracking, time management of the fleet etc. Various tracking devices are used to track/trace the vehicle or the fleet. Generally, the tracking devices capture Geo location of the vehicle, at a defined frequency, and send the information back to a device monitor system. This helps fleet management crew to know whereabouts of the vehicles at any point of time for location of the vehicle and speed of the vehicle.

However, such system face certain problems. Firstly, there is no way to know whether the intended driver is driving the vehicle or has he given the task to someone else. Secondly, in case vehicle is parked, whether the driver is nearby or not. Thirdly, in case the vehicle is in a halted state, what condition is the vehicle in. All such information is not available with the current tracking systems.

Therefore, to overcome the problems faced and lack of information provided by state of the art tracking systems, there is a need for an improved vehicle tracking system.

SUMMARY OF THE INVENTION

The present invention discloses a method to manage a transportation logic system comprising; capturing geo location of the vehicle; capturing geo location of the driver; comparing the distance proximity between geo location of the vehicle and the geo location of the driver, wherein the proximity distance is calculated at same instance of time; an ascertaining that the driver and vehicle are in a same place in case the distance proximity is within a tolerable distance.

In another embodiment of the invention, there is provided a transportation logic system to identify distance proximity between driver and a vehicle comprising; a driver geo location tracker; a vehicle geo location tracker; a network; and a location finder module, wherein the location finder calculates distance proximity between the geo location of the driver and the geo location of the vehicle to ascertain that the driver and vehicle are in a same place in case the distance proximity is within a tolerable distance.

BRIEF DESCRIPTION OF ACCOMPANYING DRAWINGS

The foregoing summary, as well as the following detailed description of various embodiments, is better understood when read in conjunction with the drawings provided herein. For the purpose of illustration, there is shown in the drawings exemplary embodiments; however, the presently disclosed subject matter is not limited to the specific methods and instrumentalities disclosed.

FIG. 4 is a flow chart illustrating a self-learning method in accordance with an embodiment of the invention.

DETAILED DESCRIPTION OF INVENTION

The presently disclosed subject matter is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

Reference throughout the specification to "various embodiments," "some embodiments," "one embodiment," or "an embodiment" means that a particular feature, structure, or characteristic described in connection with the embodiment is included in at least one embodiment. Thus, appearances of the phrases "in various embodiments," "in some embodiments," "in one embodiment," or "in an embodiment" in places throughout the specification are not necessarily all referring to the same embodiment. Furthermore, the particular features, structures or characteristics may be combined in any suitable manner in one or more embodiments.

Figure 1:
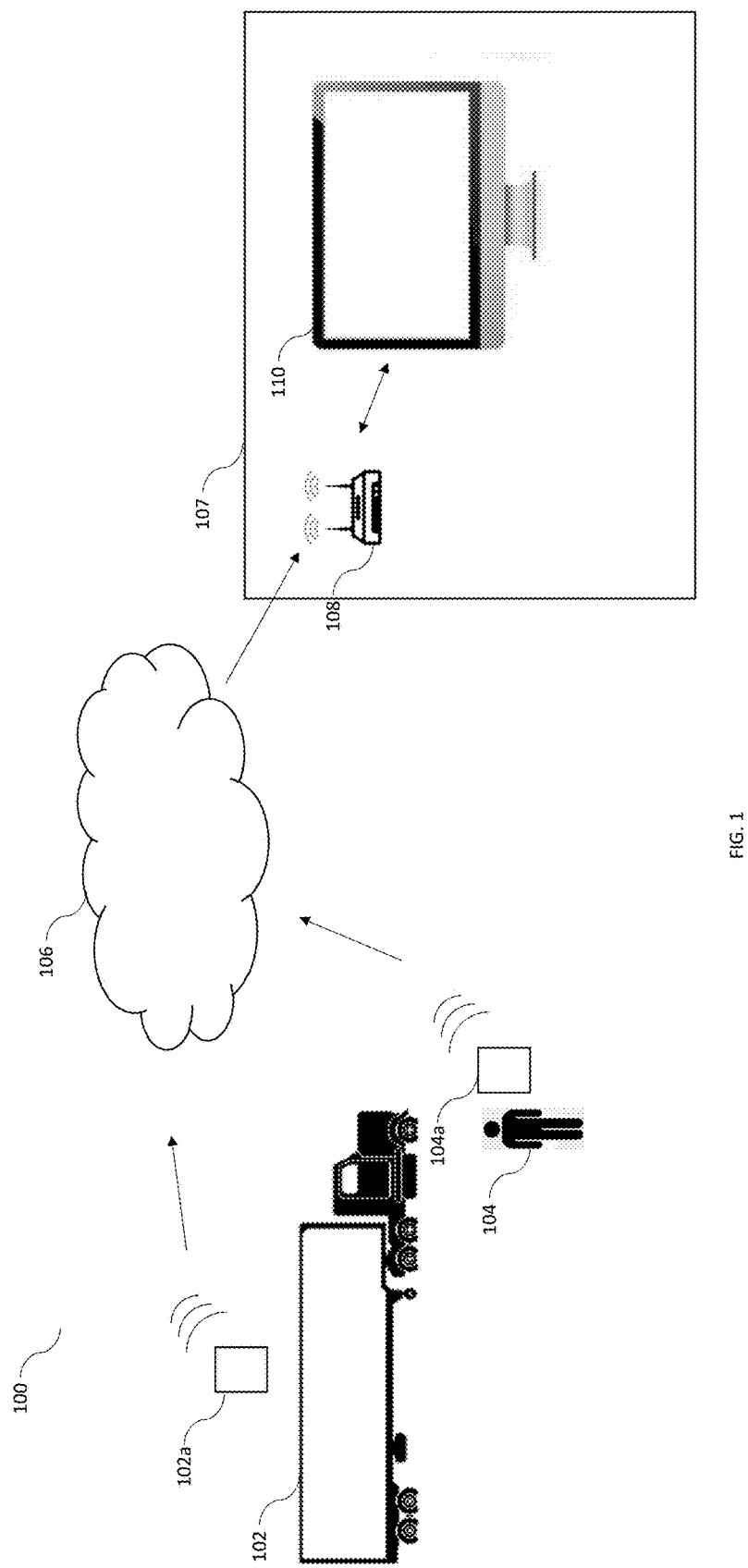
FIG. 1 is a block diagram illustrating a system for distance proximity calculation, in accordance with an embodiment of the invention.

Now referring to FIG. 1, a block diagram of a transportation logic system 100, in accordance with an embodiment of the invention. The system 100, as per an embodiment of the invention helps in calculating proximity distance between a vehicle 102 and its driver 104. In an embodiment of the invention, the vehicle 102 can be a part of a fleet.

As displayed in the figure, location coordinates of the vehicle 102 and the driver 104 are tracked by using geo-location coordinates finders 102a and 104a respectively. The geo-location coordinates of the vehicle 102 and the driver 104 are collected at same instance of time or in other embodiments in such a time difference that might not affect the distance in between the vehicle 102 and driver 104.

In an embodiment of the invention the geo-location coordinates finder 102a can be placed within the vehicle 102 or on the vehicle 102. In other embodiments, the geo-location coordinates finder 102a might be a GPS tracker placed within the vehicle 102.

The geo-location coordinates finder 104a may be a wrist band or a dedicated GPS device pinned to clothes of the driver 104.

In an embodiment of the invention, the geo-location finders can either proactively collect and transmit location coordinates or may be triggered using a signal pulse.

In yet another embodiment of the invention, the location coordinates includes latitude and longitude information.

The geo-location coordinates finders 102a, and 104a are connected to a remote facility 107. The remote facility 107 could be a monitoring station for fleet management. The connection, between the geo-location coordinates finders 102a and 104a, can be a standard network 106. The network 106 may be a standard wireless network connection. The wireless connection may vary from mobile network to satellite communication network etc.

The remote facility 107 includes a location finder module 108. The location finder module receives the geo-location coordinates transmitted through the network 106 by the geo-location coordinates finders 102a and 104a, the location finder module 108 may be, in an embodiment of the invention however not limiting to the scope of the invention, a router or a switch. Details regarding the location finder module 108 will be discussed in detail in conjunction with FIG. 2.

The location finder module 108 can be further connected to a display 110. The display 110 may be chosen from a group comprising a plasma screen display, an LED display, an LCD display, a UHD display, a monochromic display of all possible sizes. All the details regarding the location coordinates received and processed results can be displayed on the display 110. The display 110 can also be further configured to display a visual warning related to location coordinates of the driver 104 and the vehicle 102. User of the display 110 can also initiate a geo-location coordinates collection trigger from the display 110 and send trigger signal through the location finder module 108 to the geo-location coordinates finders 104a and 102a. There can be a single trigger signal or two different trigger signals each of which initiates different geo-location finders. The timing difference between the two trigger signals can be so chosen that the time difference is within a tolerable limit that does not affect the location tracking of the vehicle 102 and the driver 104.

Figure 2:
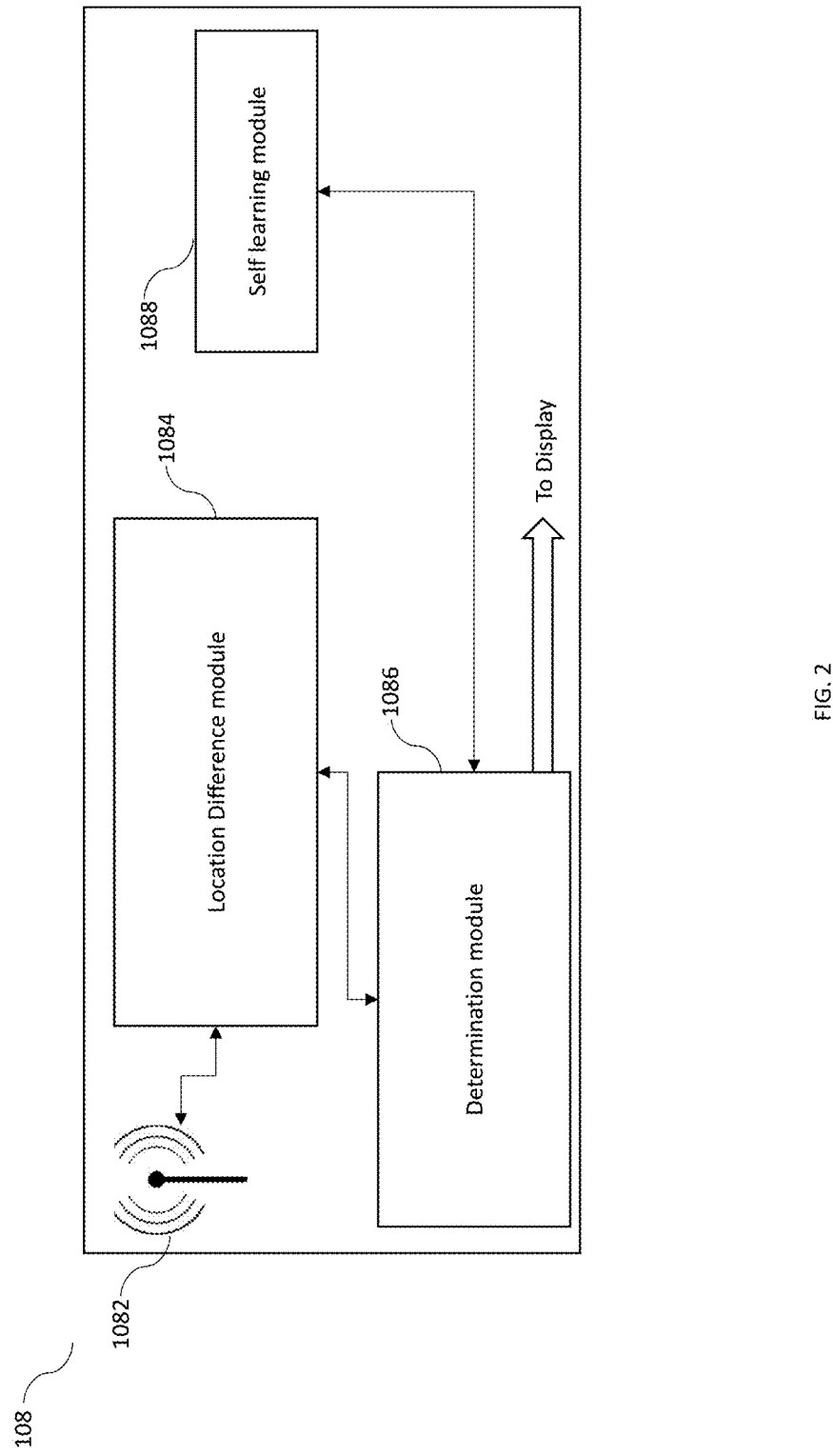
FIG. 2 is a block diagram illustrating a location finder module, in accordance with an embodiment of the invention.

Referring now to FIG. 2, a block diagram of the location finder module 108, in accordance with an embodiment of the invention. As described above, the location finder module 108 can be a router or a switch or an application specific device. The location finder module 108 includes an antenna 1082 that receives the location coordinates transmitted by the geo-location coordinates trackers 102a and 104a through the network 106.

The antenna 1082 can be an embedded antenna. The antenna receives signals including the location coordinates and passes on the information to a location difference module 1084. The input signals act as triggers for the location difference module 1084 that identifies the geo-location from the signals and calculates the difference between geo-locations of the driver 104 and the vehicle 102. The determined difference information is then forwarded to a determination module 1086. The determination module 1086, receives the difference and analyzes whether the distance is within a tolerable limit or not. In an embodiment of the invention, the location finder module 108 also includes a self-learning module 1088 to determine a tolerable limit for distance between geo-locations of the driver 104 and the vehicle 102 dynamically based on multiple factors. The determination method is depicted in flow chart shown in FIG. 4 that will be described later in the description.

In an embodiment of the invention, after receiving the distance difference, the determination module 1086, queries the self-learning module 1088 for current tolerable limit. Then it matches the distance received with the tolerable limit and in case the difference is within the tolerable limit it displays to the user of the display 110 that the driver 104 and vehicle 102 are at a same place. However, in case, the difference is not within the tolerable limit, then the user is displayed with an alarm showing that the driver 104 is not near the vehicle 102. It is to be understood that the alarm or information may be displayed or sent via other forms as well like on mobile device, etc.

In an embodiment of the invention, the determination module 1086 may include or may be connected to a remote memory (not shown in figure). The remote memory may include map details and information about specific places or type of places as per their geo-location coordinates. These places could be eating joints, gas filling stations, etc. Hence, before determination of the geo-location of the driver 104 and his vehicle 102, the determination module 1086 may check for such information. In case, the vehicle 102 is at such a specific location, this information may be utilized to determine that driver may be filling gas, or having a meal etc.

Figure 3:
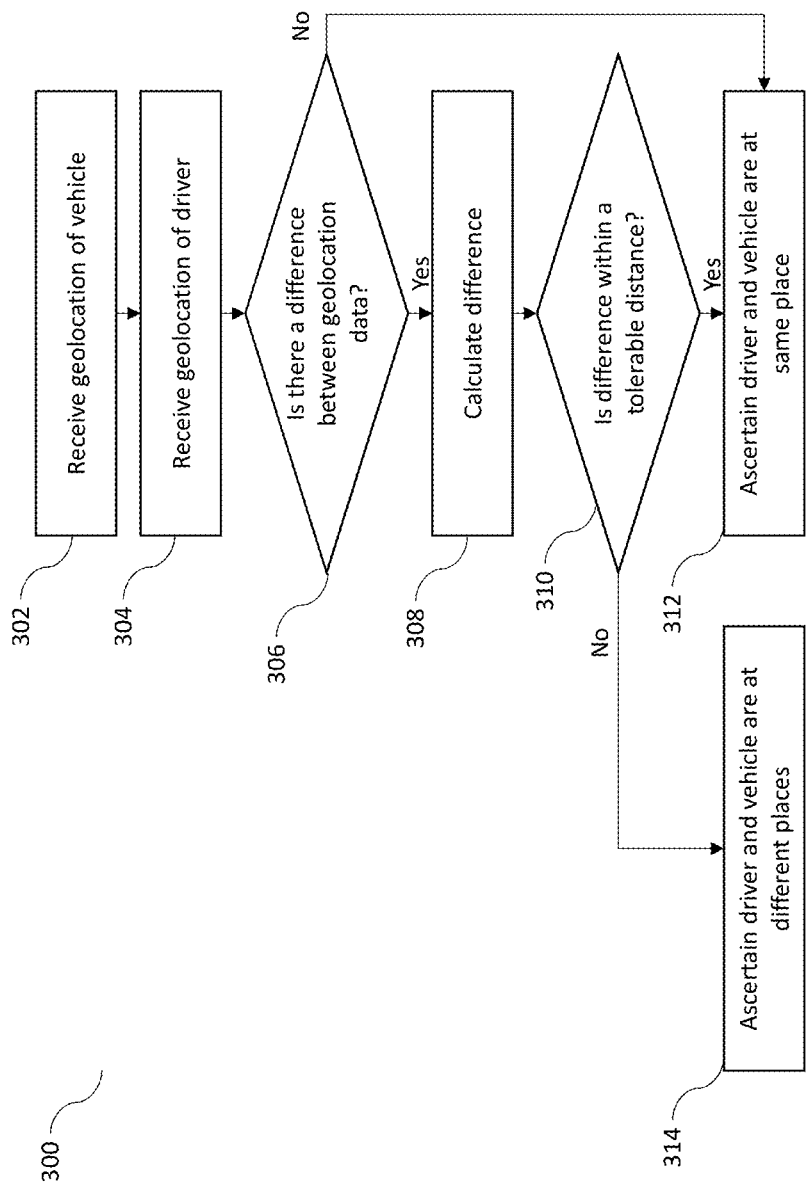
FIG. 3 is a flow chart illustrating a method of proximity distance calculation, in accordance with an embodiment of the invention.

Now referring to FIG. 3, a flow chart illustrating a method 300 to manage a transportation logic system 100 (described in conjunction with FIG. 1). The method 300 begins at step 302, wherein the geo-location of the vehicle 102 is received from the geo-location finder 102a by the location finder module 108. Further, at step 304, the geo-location of the driver 104 is received from the corresponding geo-location finder 104a. In an embodiment of the invention the geo-location coordinates of both the driver 104 and the vehicle 102 are either received at same instance of time or at different instances. The time difference between the two instances is within a tolerable calculated limit that does not affect the measurability of the geolocation coordinates. In another embodiment of the invention, the vehicle 102 may be a trailer having multiple wagons. For such scenarios, multiple tracking devices are available to monitor different wagons. The distance is then calculated between driver and across other vehicles.

Further at step, 306 the location finder module 108 checks whether there is any difference between the received two geolocation coordinates. In case there is no difference, then the location finder module 108 ascertains that the driver 104 and the vehicle 102 are both at same place and hence no problem for fleet management crew at station 107. However, in case there is a difference between the received geolocations, the location finder module calculates the difference in between the two geolocation coordinates received at step 308. Further at step 310, the location finder module 108 determines whether the difference between the geolocations is within a tolerable distance or not. The tolerable distance limit is calculated using the self-learning module 1088 that dynamically modifies the tolerable distance. The dynamic modification is based on various criteria that will be explained later. In case the difference is within a tolerable limit at current time, then at step 312 the location finder module 108 ascertains that the driver 104 and the vehicle 102 are within a proximity or at same place. However, in case the difference is more than the tolerable limit, the location finder module ascertains that the driver 104 and the vehicle 102 are at geographically different places at step 314. Both the information can be displayed on the display 110 at a remote fleet management station.

Now referring to FIG. 4 a flow chart illustrating a method 400 to determine tolerable distance by the self-learning module 1088 in accordance with an embodiment of the invention. The method 400 begins at step 402, wherein the self-learning module 1088, for calculation of the tolerable distance at current time fetches time of day. Based on time of day there may be a distance difference between the driver 104 and the vehicle 102. For e.g. the driver 102 must be in a store and the vehicle 102 outside the store at a distance place. In case, there is some information available from fleet management station 107 or within vehicle's storage then at step 404, the location finder module determines whether the tolerable distance needs to be modified. In case it is to be modified then at step 414, the distance is modified. However, if there is no such information, then the location finder module 108, at step 406, fetches schedule of vehicle. There might be some service coming up, or there might be delivery scheduled at that time. If such information is present, then at step 414, the tolerable distance limit is modified. However, if no such information is available, then at step 410, maintenance schedule of the vehicle 102 is accessed. As step 412, it is determined whether the tolerable limit is to be modified. In case there is a scheduled maintenance, then at step 414, the tolerable distance is modified.

It is to be understood that the above conditions or criteria are exemplary and there might be other criteria in which tolerable limit of distance can be modified.

The flowchart in the Figures illustrates the functionality, and operation of possible implementations of methods according to various embodiments of the present subject matter. In this regard, each block in the flowchart or block diagrams may represent a module, segment, or portion of instructions, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

While certain embodiments have been described, these embodiments have been presented by way of example only, and are not intended to limit the scope of the present disclosure. Indeed, the novel methods, devices, and systems described herein may be embodied in a variety of other forms. Furthermore, various omissions, substitutions, and changes in the form of the methods, devices, and systems described herein may be made without departing from the spirit of the present disclosure. The accompanying claims and their equivalents are intended to cover such forms or modifications as would fall within the scope and spirit of the present disclosure.

What is claimed is:

1. A transportation logic system to identify distance proximity between an intended driver and a vehicle in fleet management, the transportation logic system comprising:
    a driver geo location tracker to capture a geo location of the intended driver of a fleet;
    a vehicle geo location tracker to capture a geo location of the vehicle;
    a network to wirelessly connect the driver geo location tracker and the vehicle geo location tracker;
    a display in a remote facility of the fleet management, and
    a location finder module, the location finder module communicated with the remote facility and connected to the driver geo location tracker and the vehicle geo location tracker via the network, to:
        receive the geo location of the vehicle,
        receive the geo location of the intended driver,
        calculate a difference between the geo location of the vehicle and the intended driver,
        determine whether the difference is within a tolerable distance, wherein the tolerable distance is determined based on map details, the geo location of the vehicle and the intended driver, and dynamically determined or modified based on at least one of a maintenance schedule of the vehicle, a time of a day, or a delivery schedule of the vehicle,
        wherein when the difference is within the tolerable distance, ascertain that the intended driver and the vehicle are nearby and display the geo location of the vehicle and the intended driver in the display, and
        when the difference is not within the tolerable distance, ascertain that the intended driver and the vehicle are at different places and display a visual warning of the geo location of the vehicle and the intended driver in the display.

2. The system of claim 1 further comprises a self-learning module within the location finder module, wherein the self-learning module calculates the tolerable distance.

3. The system of claim 1, wherein the vehicle comprises multiple trailers with a corresponding geo location tracker.

4. The system of claim 3, wherein the vehicle location is determined correlating distance between the multiple trailers and corresponding location determined from each of the corresponding geo location trackers.

5. The system of claim 1, wherein the location finder module is a router or a switch.

6. The system of claim 1, wherein the driver geo location tracker is a wearable device.

7. The system of claim 6, wherein the wearable device is a watch, a smart-band, a smart cap, or a mobile device.

8. The system of claim 1, wherein the driver geo location tracker and the vehicle geo location tracker collects coordinates information.

* * * * *